United States Patent [19]

Shah

[11] 4,021,397

[45] May 3, 1977

[54] STABLE DISPERSIONS OF WATER SOLUBLE AMIDE POLYMERS

[75] Inventor: Pravin K. Shah, Sheffield Lake, Ohio

[73] Assignee: The B. F. Goodrich Company, Akron, Ohio

[22] Filed: Oct. 23, 1975

[21] Appl. No.: 625,077

Related U.S. Application Data

[63] Continuation-in-part of Ser. No. 537,361, Dec. 30, 1974, abandoned.

[52] U.S. Cl. .................. 260/29.6 N; 260/29.6 HN; 260/29.6 MN; 260/29.6 TA
[51] Int. Cl.² .......................................... C08L 33/26

[58] Field of Search ............. 260/29.4 UA, 29.6 N, 260/29.6 HN, 29.6 MN, 45.9 R, 29.6 TA

[56] References Cited

UNITED STATES PATENTS

| 3,597,381 | 8/1971 | Ripley | 260/29.6 HN |
| 3,681,311 | 8/1972 | Patron et al. | 260/29.6 MN |

*Primary Examiner*—M. J. Welsh
*Attorney, Agent, or Firm*—J. Hughes Powell, Jr.

[57] ABSTRACT

Latices of polymers containing polymerized watersoluble amides may often thicken or gel on storage. The use of small amounts of hydroxylamine sulfate, added usually during processing, after polymerization, during storage or even added after latex thickening has begun, retards thickening and gelling of such latices.

10 Claims, No Drawings

STABLE DISPERSIONS OF WATER SOLUBLE AMIDE POLYMERS

CROSS REFERENCE TO RELATED APPLICATION

This application is a continuation-in-part of my copending application Ser. No. 537,361 filed Dec. 30, 1974 now abandoned.

BACKGROUND OF THE INVENTION

Polymers of water soluble acrylamide in latex form are well known. Typical latices of such polymers are those described in the U.S. patents listed hereinafter. 3,231,533 discloses latices of polymers of at least one lower alkyl ester of an $\alpha,\beta$-olefinically unsaturated monocarboxylic acid, from 0 to 5% of an $\alpha,\beta$-olefinically unsaturated nitrile, from about 0.1 to 5% by weight of an $\alpha,\beta$-olefinically unsaturated carboxylic acid and about 0.1 to 5% by weight of a N-alkylol amide of an $\alpha,\beta$-olefinically unsaturated carboxylic acid. 3,344,103 discloses latices of more than 50% butadiene-1,3, styrene or acrylonitrile, 0.1 to 3% of an N-alkylol amide of an $\alpha,\beta$-olefinically unsaturated monocarboxylic acid and about 0.1 to 10% of an $\alpha,\beta$-olefinically unsaturated monocarboxylic acid. 3,047,548 discloses similar copolymers. 3,457,209 discloses latices of copolymers of a lower alkyl acrylate and an $\alpha,\beta$-olefinically unsaturated N-alkylol amide overpolymerized with an olefinically unsaturated carboxylic monomer. 3,315,012 discloses latices of a mixture of two latices, one an interpolymer of a lower acrylic ester and an unsaturated N-alkylol amide and another latex of a lower acrylic ester and an olefinically unsaturated amide. 3,361,695 discloses latices of at least 80% ethyl acrylate, more than 15% acrylic acid and 1 to 5% N-methylol methacrylamide. 3,288,740 discloses latices of an alkaline earth salt of an $\alpha,\beta$-monoethylenically unsaturated monocarboxylic acid with up to 30% of an N-methylol amide or N-methylol acid ester of an aliphatic alcohol and $\alpha,\beta$-ethylenically unsaturated dicarboxylic acid along with an acrylic ester and other vinylidene monomers. 3,137,589 discloses a latex of up to 20% of an unsaturated carboxylic acid amide substituted on nitrogen, at least one methylol group and 80 to 90% by weight of another ethylenically unsaturated polymerizable compound. All of these latices and similar materials wherein the polymer contains a water soluble amide are subject to thickening and gelling under certain processing and storage conditions unless the unreacted water soluble acrylamide or its derivative is completely removed from said latex.

SUMMARY OF THE INVENTION

The thickening and gelling of latices of polymers containing water soluble polymerizable amides of $\alpha,\beta$-olefinically unsaturated carboxylic acids and derivatives thereof is inhibited by adding hydroxylamine salts to such latices.

DETAILED DESCRIPTION

As is obvious from the description of the prior art and the Summary of the Invention, this invention is applicable to any latex of polymers made with and containing water soluble polymerizable amides.

The hydroxylamine salts will be used in amounts greater than 0.005 weight part per 100 weight parts of polymer or monomers, more preferably about 0.01 to 0.1 weight part. Amounts as high as one part or more may be used if desired but it will be understood by those skilled in the art that larger amounts, because of the salt effect, may contribute to latex instability. It was quite surprising to find hydroxylamine salts effective in this invention. It has been my experience that many normal polymerization inhibitors were not effective to stop the thickening effect which is an object of this invention. For example, ditertiaryamyl hydroquinone and the monomethyl ether of hydroquinone are both ineffective in stopping the thickening of water soluble amide monomer polymer latices in storage. Even more surprising, diethyl hydroxylamine was found to be ineffective in stopping the rise in viscosity. Any water soluble salt of hydroxylamine may be used, for example, hydroxylamine sulfate, chloride, nitrate, acetate and the like. Normally used is hydroxylamine salts such as a sulfate of the formula

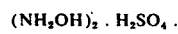

$(NH_2OH)_2 \cdot H_2SO_4$.

While the hydroxylamine salt may be added during the polymerization normally in the latex stage it preferably is added after the polymerization has been completed. It may be added during further processing, it may be added prior to or during storage. It has been observed, even in latex that begins to thicken on storage, that when hydroxylamine salts are added that further thickening is stopped. Normally the hydroxylamine salt is added in a dilute solution of less than 10%, more preferably about 2 to 5%. If the concentration is too high, latex stability may be effected. The hydroxylamine salt normally is neutralized with ammonia to a pH of about 7 to 9 but this is not essential to obtain activity. The hydroxylamine salt has been found to be effective when the residual water soluble monomer present in the latex is present in amounts as only a few parts per million, more usually about 0.001% up to about 1% or more.

Normally, such polymers contain less than 50 and more normally less than 20 down to as low as 0.01 weight parts per 100 weight parts of the water soluble polymerizable amide. Such amides include $\alpha,\beta$-olefinically unsaturated amide and derivatives thereof. For example, N-methylol acrylamide, N-ethanol acrylamide, N-propanol acrylamide, N-methylol methacrylamide, N-ethanol methacrylamide, N-methylol maleimide, N-methylol maleamide, N-methylol maleamic acid esters, the N-alkylol amides of the vinyl aromatic acids such as N-methylol-p-vinyl benzamide, and the like and others. Also included herein are the alkylol ethers of the foregoing types of N-alkylol amides, an illustration of which is $CH_2=CHCONHCH_2OA$ wherein A is an alkyl group having from 1 to 8 carbon atoms. Most preferred are the N-alkylol amides of the following structure

$$CH_2=C-CONHR_3-O-R_4$$
$$|$$
$$R_2$$

wherein $R_2$ is a member of the group consisting of hydrogen and an alkyl group having from 1 to 4 carbon atoms, $R_3$ is an alkylene group having from 1 to 8 carbon atoms and $R_4$ is a member of the group consisting of hydrogen and an alkyl group having from 1 to 8 carbon atoms.

Polymerizable amides embodied herein also include acrylamide, N-methyl acrylamide, N-t-butyl acrylamide, N-cyclohexyl acrylamide, methacrylamide, N-ethyl acrylamide, maleic acid amide, maleic acid diamide, fumaric acid amides, crotonic acid amide, itaconic acid amide, p-vinyl benzamide. Most preferred are amides having the structure

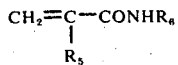

wherein $R_5$ is a member of the group consisting of hydrogen and an alkyl group having from 1 to 4 carbon atoms and $R_6$ is a member of the group consisting of hydrogen and an alkyl group having from 1 to 6 carbon atoms.

The lower acrylic esters embodied in the polymers of this invention are those having the structure

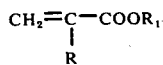

wherein R is a member of the class consisting of hydrogen and an alkyl group having from 1 to 4 carbon atoms and $R_1$ is a member of the class consisting of alkyl groups having from 1 to 8 carbon atoms and cyano alkyl groups having from 2 to 8 carbon atoms. Representative lower alkyl acrylic esters are methyl acrylate, ethyl acrylate, the propyl acrylates, the butyl acrylates, the amyl acrylates, the hexyl acrylates, cyclohexyl acrylate, the heptyl acrylates, and the octyl acrylates, the cyanoalkyl acrylates such as alpha-cyano methyl acrylate having the structure $CH_2=CH-COOCH_2CN$, $\alpha$-cyanoethyl acrylate having the structure.

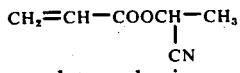

$\beta$-cyanoethyl acrylate having the structure $CH_2=CH-COOCH_2CH_2CN$ the $\alpha$, $\beta$ and $\gamma$-cyano propyl acrylates, the cyanobutyl acrylates, the cyanoamyl acrylates, the cyanohexyl acrylates and the cyanoheptyl acrylates; alkyl methacrylates such as methyl methacrylate, ethyl methacrylate, the propyl methacrylates, the butyl methacrylates, the amyl methacrylates, the hexyl methacrylates, cyclohexyl methacrylate, the heptyl methacrylates, and the octyl methacrylates; cyanoalkyl acrylates such as $\alpha$-cyanomethyl methacrylate, $\alpha$-cyanoethyl methacrylate, $\beta$-cyanoethyl methacrylate, the cyanopropyl methacrylates, the dicyanopropyl methacrylates, the cyanobutyl methacrylates, the cyanocyclohexyl methacrylates, the cyanoheptyl methacrylates and the like and others. Most preferred in the present invention are the alkyl and cyanoalkyl acrylic esters in which the alkyl group contains from 1 to 4 carbon atoms.

The $\alpha,\beta$-olefinically unsaturated carboxylic acids used in polymers of this invention are those having from 3 to 6 carbon atoms, representative members of which include acrylic acid, methacrylic acid, ethacrylic acid, mesaconic acid, citraconic acid, sorbic acid, maleic acid, crotonic acid and the like and anhydrides thereof. The preferred monomeric acids are the $\alpha,\beta$-monoolefinically unsaturated carboxylic acids. The most preferred are the $\alpha,\beta$-monoolefinically unsaturated monocarboxylic acids, particularly acrylic and methacrylic acids.

Useful copolymers can contain one or more other polymerizable monomers, preferably vinylidene ($CH_2=C<$) monomers, with the lower alkyl acrylate and the N-alkylol amide. Such polymerizable comonomers may constitute up to as much as 49% by weight of the polymer. Such polymerizable monomers include conjugated dienes such as butadiene and isoprene; $\alpha$-olefins such as ethylene, propylene and isobutylene; vinyl halides such as vinyl chloride, vinyl fluoride and vinylidene chloride; vinyl esters such as vinyl acetate; vinyl aromatics such as styrene, $\alpha$-methyl styrene, vinyl toluene, vinyl naphthalene; alkyl vinyl ethers such as methyl vinyl ether, isopropyl vinyl ether, n-butyl vinyl ether and isobutyl vinyl ether; methacrylic acid, ethacrylic acid, acrylonitrile and the like.

Of particular utility are copolymers of the lower acrylic esters wherein R is hydrogen, methyl or ethyl and $R_1$ contains 1 to 8 carbon atoms present in amounts of greater than 50 weight parts; N-methylol acrylamide or N-methylol methacrylamide present in amounts from about 0.1 to 10% weight parts; acrylamide or methacrylamide in amounts from about 0.1 to 10 weight parts, both more preferably no greater than 5 weight parts, optionally acrylic or methacrylic acid present in amounts from about 0.1 to 5 weight parts; and optionally other vinylidene monomers containing at least one terminal $CH_2=C<$ group selected from the group consisting of styrene, acrylonitrile, methyl methacrylate, vinyl chloride and vinylidene chloride.

While it is well known that acrylate copolymers can be made in the absence of any emulsifier they can be made for example, by the methods clearly set forth in the U.S. patents described above.

The polymers embodied herein are prepared in the preferred manner in an aqueous medium in the presence of a suitable polymerization catalyst in the range of about 20 to 60% total solids but may be diluted to as low as 1, usually 3 to 5% and concentrated as high as 68 − 75%. The aqueous medium may be emulsifier free or it may contain an emulsifier. Suitable emulsifiers include organic sulfates and sulfonates such as sodium lauryl sulfate, ammonium lauryl sulfate, the alkali metal and ammonium salts of sulfonated petroleum or paraffin oils, the sodium salts of aromatic sulfonic acids such as the sodium salt of naphthalene sulfonic acids, the sodium salts of dodecane-1-sulfonic acid, octadiene-1-sulfonic acid, etc.; aralkyl sulfonates such as sodium isopropyl benzene sulfonate, sodium dodecyl benzene sulfonate and sodium isobutyl naphthalene sulfonate; alkali metal and ammonium salts of sulfonated dicarboxylic acid esters and amides such as sodium dioctyl sulfosuccinate, sodium octadecyl sulfosuccinamate and the like, others. While the so-called cationic emulsifiers such as the salts of strong inorganic acids and organic bases containing long carbon chains may be used, preferred, are the alkali metal and ammonium salts of aromatic sulfonic acids, aralkyl sulfonates and long chain alkyl sulfates. In addition to the above and other polar or ionic emulsifiers, still other materials which may be used singly or in combination with one or more of the foregoing types of emulsifiers include the so-called "non-ionic" emulsifiers such as the polyether alcohols prepared by condensing ethylene or propylene oxide with higher alcohols, the fatty alkylol-amine condensates, the diglycol esters of lauric, oleic and stearic acids, and others. It is also often desirable to add postpolymerization emulsifiers to the latices embodied herein for improved stability.

The catalyst, required for satisfactory polymerization rate, may be any of those commonly employed for the polymerization of acrylic monomers including the various peroxygen compounds such as hydrogen peroxide, benzoyl peroxide, pelargonyl peroxide, cumene hydroperoxide, tertiary butyl hydroperoxide, 1-hydroxycyclohexyl hydroperoxide, tertiary butyl diperphthalate, tertiary butyl perbenzoate, sodium, potassium and ammonium persulfate and others.

Particularly preferred as polymerization initiators are the water soluble peroxygen compounds such as hydrogen peroxide, and the sodium, potassium and ammonium persulfates, the water soluble oxidation-reduction or "redox" types of catalysts, and the heavy metal activated, water-soluble peroxygen and redox catalysts. Included in this preferred list are the water-soluble persulfates, the combination of one of the water-soluble peroxygen compounds such as potassium persulfate with a reducing substance such as a polyhydroxy phenol, an oxidizable sulfur compound such as sodium bisulfite, sodium sulfite, sodium formaldehyde sulfoxylate, and the like; the combination of a water-soluble peroxygen compound such as potassium persulfate with a reducing substance such as a polyhydric phenol, an oxidizable sulfur compound such as sodium bisulfite, sodium sulfite and the like; the combination of a water-soluble peroxygen compound such as a potassium persulfate and dimethylamino propionitrile; the combination of a water-soluble peroxygen compound with a reducing sugar or with a combination of a diazomercapto compound and a water-soluble ferricyanide compound and others. Heavy metal ions which greatly activate potassium persulfate catalyzed and redox catalyzed polymerizations include those of silver, copper (ic), iron, cobalt, nickel and others. The preferred range of catalyst as above defined is from about 0.01 to about 3 parts by weight per 100 parts by weight of monomer.

While polymerization may be carried out in the presence of air, the rate of reaction is ordinarily faster in the absence of oxygen and hence polymerization in an evacuated vessel, at reflux, or under an inert atmosphere such as nitrogen is preferred. The temperature at which the polymerization is carried out is not critical, it may be varied widely from −30° C. to 100° C. or higher, though best results are generally obtained at a temperature of from about 0° C. to about 90° C. While the pH of the polymerization system is not critical, it is preferred that a pH of about 7 or below be employed during the polymerization reaction. The polymer latex may subsequently be adjusted to any desired pH.

Other polymerization techniques and practices employed in the preparation of acrylic polymers may also be used in polymerizing the monomer mixture herein described. For example, the use of mercaptan modifiers in the reaction mixture is sometimes desirable and results generally in lower raw polymer viscosity and other allied plastic properties. Modifiers such as the primary, secondary and tertiary aliphatic mercaptans containing from 4 to 16 carbon atoms are particularly useful in this invention.

Typical embodiments showing the practice of the invention is demonstrated hereinafter.

In a three liter three-neck flask equipped with agitator, reflux condenser and thermometer, 65 parts of distilled water was charged. A premix was prepared as follows: 30 parts of water with the emulsifier in a container with an agitator with the monomers listed below.

9% of the premix was added to the reactor. The reactor was heated to 70° C. -75° C. and a 10% solution of ammonium persulfate was added. The reaction will start and the temperature will rise to about 80° to 85° C. When the heat slows down start metering the remainder of the monomer premix for about one hour at regular rate. At the completion of metering, control the temperature at 85° C. for one hour. Cool it down to 30° C. and filter it. The latex is then stripped of unreacted monomers by heating in a vacuum or stripped with steam. The particulars of the runs are set forth below. DB means calculated on a dry basis.

TABLE I

| Latex No. | 1 | 2 | 3 |
|---|---|---|---|
| Distilled water | 99 | 99.0 | 99 |
| Na-lauryl sulfate (30%) | 1.0D.B. | 1.2D.B. | 1.5D.B. |
| Ethyl acrylate | — | 36 | 98.2 |
| Acrylonitrile | 20 | 15 | — |
| n-Butyl acrylate | 76 | 36 | — |
| Styrene | — | 9 | — |
| N-methylol acrylamide (60%) (NMA) | 1.5D.B. | 1.5D.B. | 1.8D.B. |
| Acrylamide | 2.5 | 2.5 | — |
| Ammonium persulfate | 0.3 | 0.3 | 0.3 |
| Before stripping: | | | |
| Total solids | 48.7 | 45.4 | 47.0 |
| pH | 5.2 | 5.3 | 3.0 |
| Brookfield LVT viscosity in cps | 231 | 624 | 40 |
|  | (2-60) | (3-60) foamy | (1-60) |
| Surface tension dynes/cm | 45.8 | 48.3 | 39.9 |
| Residual acrylate monomer | 1.41D.B. | 1.84D.B. | 0.106D.B. |
| After stripping: (RINCO) | | | |
| Total solids | 48.7* | 45.6* | 49.0 |
| Res. acrylate monomer | 0.855D.B. | 0.92D.B. | Nil |
| Res. NMA + Acrylamide | 0.246D.B. | 0.33D.B. | Nil |

*Diluted by 2% before stripping
D.B. - dry basis

To demonstrate on these examples, the thickening observed on storage, and also the utility of the hydroxylamine salts, there was added to the stripped latex, more catalyst and an iron complex and the viscosity change during storage observed.

TABLE II

| Latex No. | | 1 | | | 2 | | | 3 | |
|---|---|---|---|---|---|---|---|---|---|
| Parts on dry wt. basis | | | | | | | | | |
|  | 100 | 100 | 100 | — | — | — | — | — | — |
|  | — | — | — | 100 | 100 | 100 | — | — | — |
|  | — | — | — | — | — | — | 100 | 100 | 100 |
| Ammonium persulfate (5%) | .1 | .1 | .1 | .1 | .1 | .1 | .1 | .1 | .1 |
| NaFe complex (%) | .01 | .01 | .01 | .01 | .01 | .01 | .01 | .01 | .01 |
| Hydroxylamine sulfate (5%) | | | | | | | | | |
| as is, pH 3 | — | .02 | — | — | 0.02 | — | — | 0.02 | — |
| pH to 7, with NH$_4$OH | — | — | .02 | — | — | 0.02 | — | — | 0.02 |
| Distilled water | 0.4 | — | — | .4 | — | — | .4 | — | — |
| Brookfield viscosity, just after additions | 395 | 415 | 405 | 310 | 420 | 325 | 50 | 50 | 50 |
| Brookfield viscosity  1 day | 380 | 405 | 380 | 313 | 435 | 290 | 50 | 50 | 50 |
| 2 days | 375 | 410 | 365 | 425 | 450 | 290 | | | |
| 3 days | 490 | 432 | 410 | 1800 (3–60) | 640 (3–60) | 330 | | | |
| 4 days | 636 (3–60) | 461 | 440 | 2680 (3–60) | 626 (3–60) | 333 | | | |
| 7 days | 1020 (3–60) | 480 | 450 | 6000 (4–60) | 720 (3–60) | 350 | 50 | 50 | 50 |

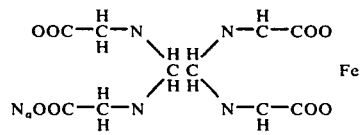

These examples clearly show that when hydroxylamine sulfate is added to self-curing latices containing both N-methylol acrylamide and acrylamide that viscosity increase on storage is substantially nil as compared to latices not containing hydroxylamine sulfate. This is demonstrated with latex 1 and 2 wherein controls show the increase in viscosity whereas those containing hydroxlamine sulfate do not increase in viscosity. Those tests made on latex No. 3 which contains only one amide demonstrates that the hydroxylamine sulfate is not necessary unless the latex is a self-curing latex containing at least the two different amides or an amide and a carboxyl group as is disclosed in the patents listed in the Background of the Invention above.

This invention is particularly useful in preventing latex viscosity rises of latices containing polymers comprising copolymerized together greater than 50% by weight of a copolymerized acrylic acid ester of the formula

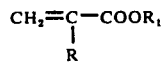

wherein R is hydrogen or methyl and $R_1$ is an alkyl group containing 1 to 8 carbon atoms and at least 0.1 weight part of an amide of the formula selected from the group consisting of (1) $CH_2=CHCONHCH_2OA$ wherein A is an alkyl group having from 1 to 8 carbon atoms,

wherein $R_2$ is a member of the group consisting of hydrogen and an alkyl group having from 1 to 4 carbon atoms, $R_3$ is an alkylene group having from 1 to 8 carbon atoms and $R_4$ is a member of the group consisting of hydrogen and an alkyl group having from 1 to 8 carbon atoms, and

wherein $R_5$ is a member of the group consisting of hydrogen and and alkyl group having from 1 to 4 carbon atoms and $R_6$ is a member of the group consisting of hydrogen and an alkyl group having from 1 to 6 carbon atoms and optionally with (1), (2) and/or (3) an $\alpha,\beta$-olefinically unsaturated carboxylic acid containing 3 to 6 carbon atoms.

The invention is useful to prevent viscosity rise while these latices are in storage or being transported, normally to latex in storage tanks or tank cars or to latex which has begun to thicken. From 0.1 to 0.3 part of hydroxylamine salt per 100 weight parts of polymer in a 5% water solution neutralized with ammonium hydroxide to a pH of greater than 7, i.e., about 8, will prevent or stop viscosity rises in the latices of this invention.

The latices of this invention are useful in leather finishing, the binding of non-woven fabrics, the impregnation and coating of textile fabrics composed of synthetic and natural fibers as well as natural-synthetic fiber blends, the impregnation and coating of paper, the coating and preservation of leather, in adhesive composition, in printing pastes for textile and paper printing and the like. The latices of this invention are particularly useful for providing improved wet strength and internal bond strength to paper and for better wet soiling and solvent resistance in non-woven fabrics. The latices embodied herein when used alone or with pigments and coloring agents are useful as indoor and outdoor paints. The rubbery and plastic polymers embodied herein are useful, per se, in the preparation of gloves, gaskets, foams, footwear, flooring and the like.

I claim:

1. A latex composition resistant to thickening or gelling or storage comprising a polymer of greater than 50% by weight of a copolymerization product of (A) acrylic acid ester of the formula

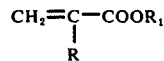

wherein R is hydrogen or methyl and $R_1$ is an alkyl group containing 1 to 8 carbon atoms and, (B) at lest 0.01 weight part of an amide of the formula selected from the group consisting of (1) $CH_2=CHCONHCH_2OA$ wherein A is an alkyl group having from 1 to 8 carbon atoms,

wherein $R_2$ is a member of the group consisting of hydrogen and an alkyl group having from 1 to 4 carbon atoms, $R_3$ is an alkylene group having from 1 to 8 carbon atoms and $R_4$ is a member of the group consisting of hydrogen and an alkyl group having from 1 to 8 carbon atoms, and

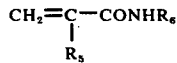

wherein $R_5$ is a member of the group consisting of hydrogen and an alkyl group having from 1 to 4 carbon atoms and $R_6$ is a member of the group consisting of hydrogen and an alkyl group having from 1 to 6 carbon atoms and a stabilizing amount of a hydroxylamine salt.

2. A composition of claim 1 wherein the total amount of said amides is from about 0.1 to less than 20 weight parts.

3. A composition of claim 2 wherein said hydroxylamine salt is a salt of an inorganic acid.

4. A composition of claim 3 wherein said salt is present in amounts from about 0.01 to less than one weight part per 100 weight parts of polymer.

5. A composition of claim 4 wherein said salt is hydroxylamine sulfate.

6. A composition of claim 5 wherein $R_1$ contains 1 to 4 carbon atoms and there is also present up to about 40 weight percent of at least one other vinylidene monomer containing at least one terminal $CH_2=C<$ group.

7. A composition of claim 6 wherein said polymer is present in said latex in amount from about 5 to about 65 weight percent.

8. A composition of claim 6 wherein said vinylidene monomer is selected from the group consisting of styrene, acrylonitrile, methyl methacrylate, vinyl chloride and vinylidene chloride.

9. The composition of claim 6 wherein the acrylic acid ester is ethyl acrylate copolymerized with N-methylol acrylamide and acrylamide in amounts of about 0.1 to 5 weight parts each of said N-methylol acrylamide and acrylamide and 0.01 to 0.1 weight part of hydroxylamine sulfate.

10. The composition of claim 6 wherein the amide selected from groups (1), (2) and (3) is present in amounts of from 0.1 to about 5 weight parts.

* * * * *